US011460569B2

(12) United States Patent
Campbell et al.

(10) Patent No.: US 11,460,569 B2
(45) Date of Patent: Oct. 4, 2022

(54) METHODS AND SYSTEMS FOR SIGNAL TRANSMISSION USING ORTHOGONAL DOPPLER CODING

(71) Applicant: Waymo LLC, Mountain View, CA (US)

(72) Inventors: Timothy Campbell, Mountain View, CA (US); Matthew Markel, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/135,106

(22) Filed: Dec. 28, 2020

(65) Prior Publication Data

US 2021/0255301 A1  Aug. 19, 2021

Related U.S. Application Data

(60) Provisional application No. 62/955,175, filed on Dec. 30, 2019.

(51) Int. Cl.
*G01S 13/50* (2006.01)
*G01S 13/28* (2006.01)
*G01S 13/02* (2006.01)

(52) U.S. Cl.
CPC .......... *G01S 13/505* (2013.01); *G01S 13/284* (2013.01); *G01S 2013/0245* (2013.01)

(58) Field of Classification Search
CPC ............. G01S 13/505; G01S 13/284; G01S 2013/0245; G01S 13/288; G01S 13/89;
(Continued)

(56) References Cited

U.S. PATENT DOCUMENTS 5,376,939 A   12/1994  Urkowitz
6,781,540 B1   8/2004  MacKey
(Continued)

FOREIGN PATENT DOCUMENTS

CN   109917340 A  *  6/2019  ............. G01S 7/282
CN   109917340 A     6/2019

OTHER PUBLICATIONS

International Search Report and Written Opinion for corresponding PCT application No. PCT/US2020/067183 dated Apr. 26, 2021.

*Primary Examiner* — Bernarr E Gregory
*Assistant Examiner* — Yonghong Li
(74) *Attorney, Agent, or Firm* — McDonnell Boehnen Hulbert & Berghoff LLP

(57) ABSTRACT

Example embodiments described herein involve techniques for orthogonal Doppler coding for a radar system. An example method may involve causing, by a computing system coupled to a vehicle, a radar unit to transmit a plurality of radar signals into an environment of the vehicle using a two-dimensional (2D) transmission antenna array, wherein the radar unit is configured to use time division multiple access (TDMA) to isolate transmit channels along a horizontal direction of the 2D transmission antenna array and Doppler coding to isolate transmit channels along a vertical direction of the 2D transmission antenna array. The method may further involve receiving, by the computing system and from the radar unit, radar reflections corresponding to the plurality of radar signals, determining information representative of the environment based on the radar reflections, and providing control instructions to the vehicle based on the information representative of the environment.

19 Claims, 15 Drawing Sheets

(58) Field of Classification Search
CPC .... G01S 13/931; G01S 7/0235; G01S 7/0236; G01S 7/006
See application file for complete search history.

(56) References Cited

U.S. PATENT DOCUMENTS

| | | |
|---|---|---|
| 7,148,839 B2 | 12/2006 | Chen |
| 7,280,604 B2 | 10/2007 | Giannakis |
| 8,081,105 B2 | 12/2011 | Tigrek |
| 9,594,159 B2 * | 3/2017 | Wang ................ G01S 7/414 |
| 9,933,520 B1 | 4/2018 | Campell |
| 10,634,775 B2 * | 4/2020 | Loesch ............... G01S 13/003 |
| 10,663,571 B2 | 5/2020 | Halbert |
| 2018/0241822 A1 | 8/2018 | Davis |
| 2019/0339376 A1 * | 11/2019 | Levy-Israel ......... G01S 13/4454 |
| 2019/0339383 A1 | 11/2019 | Campbell |
| 2019/0369223 A1 | 12/2019 | Yoshida |

* cited by examiner

METHODS AND SYSTEMS FOR SIGNAL TRANSMISSION USING ORTHOGONAL DOPPLER CODING

CROSS REFERENCE TO RELATED APPLICATION

The present patent application claims priority to U.S. Provisional Application No. 62/955,175, filed on Dec. 30, 2019, which is hereby incorporated by reference in entirety.

BACKGROUND

Radio detection and ranging systems ("radar systems") can be used to estimate distances to environmental features by emitting radio signals and detecting returning reflected signals. Distances to radio-reflective features can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped.

SUMMARY

The present disclosure generally relates to techniques for signal transmission using Doppler coding. An antenna system may use orthogonal Doppler coding to increase the channels available for signal transmission. In some applications, Doppler coding can be used to minimize peak cross-correlation in received reflections when using radar to measure aspects of the surrounding environment. By using orthogonal Doppler codes, a radar system may detect objects in the environment while reducing potential interference with other emitters operating nearby.

In one embodiment, the present application describes a method. The method involves causing, by a computing system coupled to a vehicle, a radar unit to transmit a plurality of radar signals into an environment of the vehicle using Doppler coding and receiving, by the computing system and from the radar unit, radar reflections corresponding to the plurality of radar signals. The method further involves determining information representative of the environment based on the radar reflections. The information representative of the environment indicates a position and a motion of at least one object relative to the radar unit. The method also involves providing control instructions to the vehicle based on the information representative of the environment.

In another embodiment, the present application describes a system. The system may include a radar unit and a computing device coupled to a vehicle. The computing device is configured to cause a radar unit to transmit a plurality of radar signals into an environment of the vehicle using Doppler coding and receive, from the radar unit, radar reflections corresponding to the plurality of radar signals. The computing device is further configured to determine information representative of the environment based on the radar reflections. The information representative of the environment indicates a position and a motion of at least one object relative to the radar unit. The computing device is also configured to provide control instructions to the vehicle based on the information representative of the environment.

In yet another example, the present application describes a non-transitory computer-readable medium configured to store instructions, that when executed by a computing system comprising one or more processors, causes the computing system to perform operations. The operations may involve one or more functions of the method described above.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
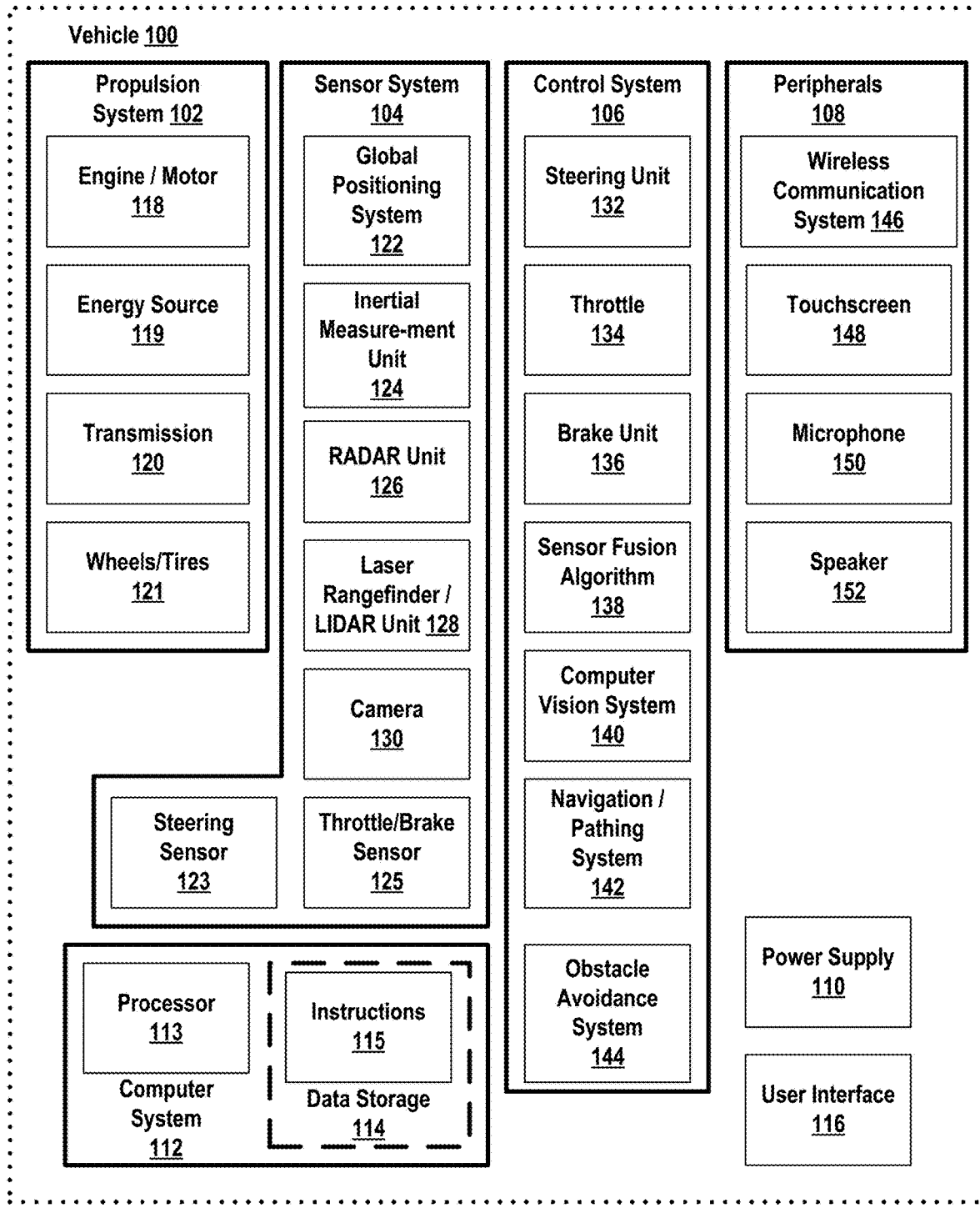
FIG. 1 is a functional block diagram illustrating a vehicle, according to one or more example embodiments.
Figure 2A:
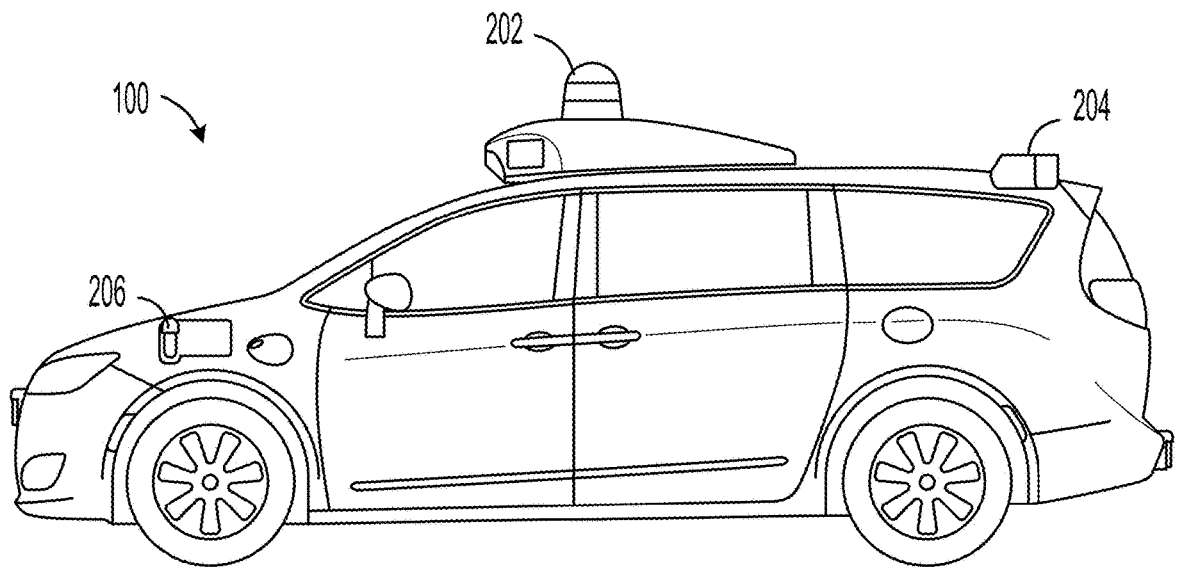
FIG. 2A illustrates a side view of a vehicle, according to one or more example embodiments.
Figure 2B:
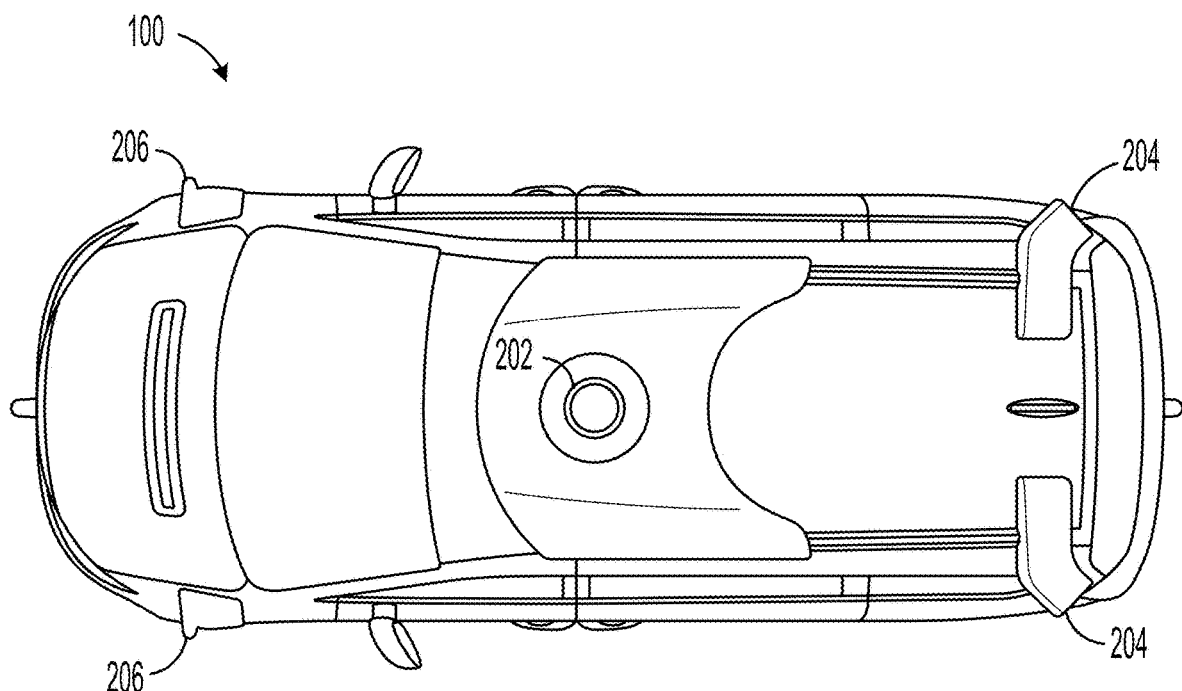
FIG. 2B illustrates a top view of a vehicle, according to one or more example embodiments.
Figure 2C:
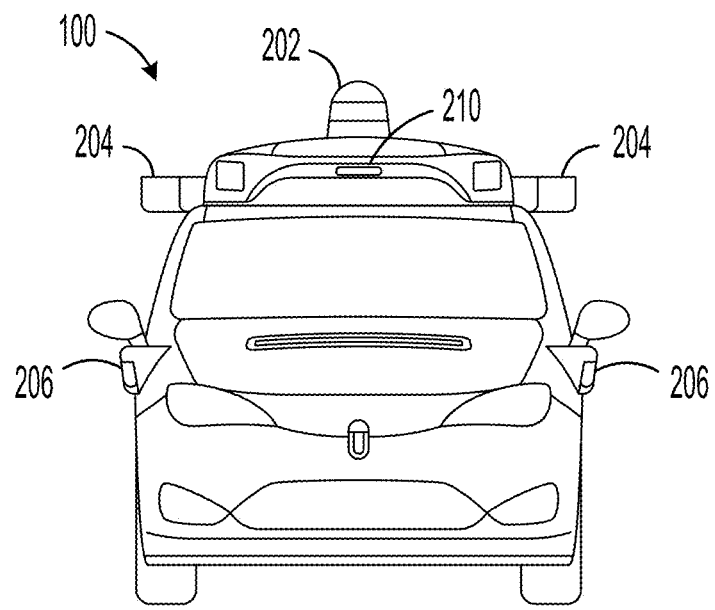
FIG. 2C illustrates a front view of a vehicle, according to one or more example embodiments.
Figure 2D:
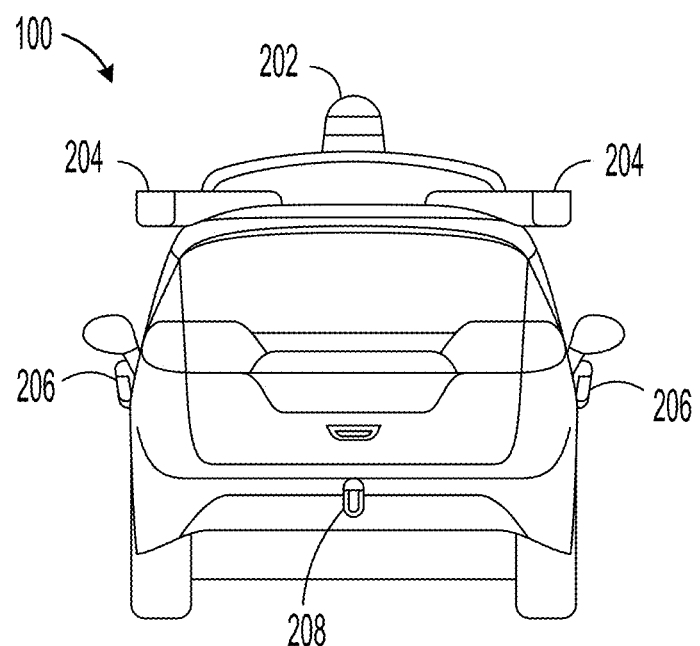
FIG. 2D illustrates a back view of a vehicle, according to one or more example embodiments.
Figure 2E:
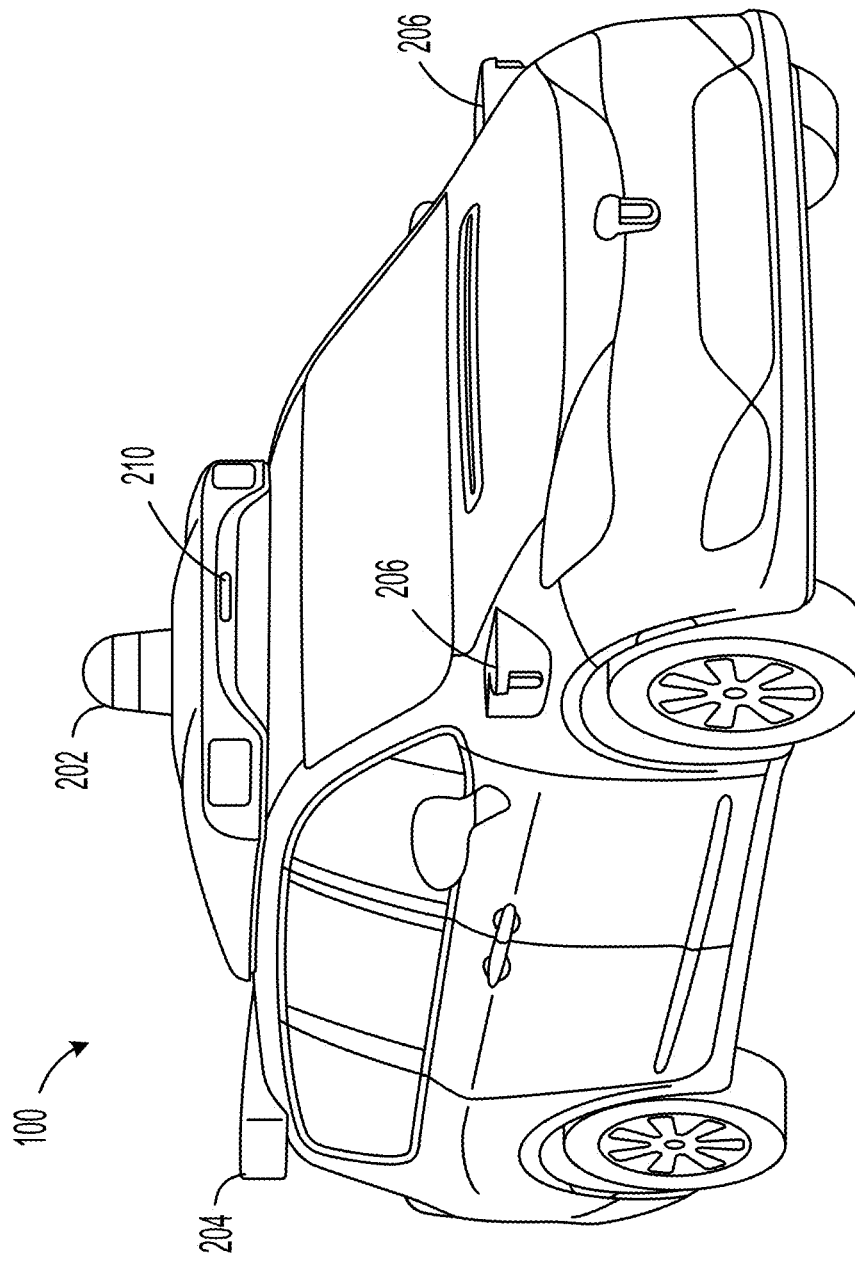
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system can use one or more antennas to emit (i.e. transmit) radar signals to measure aspects of an environment. Upon coming into contact with surfaces in the environment, emitted radar signals can scatter in multiple directions with some penetrating into various surfaces while others reflect off surfaces and back towards one or more reception antennas of the radar system. Once received by one or more reception antennas, radar reflections can be processed to generate two dimensional (2D) and/or three dimensional (3D) measurements of the environment. In particular, these measurements may convey the positions, orientations, and movements of nearby surfaces occupying the environment near the radar system.

Because a radar system can be used to measure distances and motions of nearby objects and other surfaces, vehicles are increasingly incorporating vehicle radar systems to generate measurements during navigation that can assist with vehicle navigation, obstacle avoidance, and in other ways that can boost overall vehicle safety. For instance, a vehicle may use radar to detect and identify the positions, orientations, and movements of nearby vehicles, bicycles, pedestrians, and animals. Radar can also reveal information about other features in the vehicle's surrounding environment, such as the location, arrangement, and position of road boundaries, road conditions (e.g., smooth or bumpy surfaces), weather conditions (e.g., wet or snowy roadways), and the position of traffic signs and signals.

In some applications, a vehicle radar system is used to assist a driver controlling the vehicle. For instance, radar measurements may be used to generate alerts when the vehicle drifts outside its lane, when the vehicle travels too closely to another vehicle or object, and/or in other ways that can help the driver. Radar measurements can also be used to help enable autonomous or semi-autonomous operations by the vehicle. Particularly, radar can be used along with other sensor measurements to help an autonomous vehicle understand its environment and detect changes in the environment in near real-time as discussed above. Radar measurements can also reveal information about other features in the vehicle's surrounding environment, such as road boundaries and road conditions (e.g., smooth or bumpy surfaces), weather conditions (e.g., wet or snowy roadways), traffic signs and signals, and pedestrians.

Vehicle radar systems may be designed to operate within 5 Gigahertz (GHz) of spectral region that extends between 76 GHz and 81 GHz, inclusive. Although the 5 GHz spectral region offers plenty of bandwidth to accommodate a single vehicle radar system, issues can arise when multiple vehicle radar systems are operating in the same general location. In particular, because each vehicle radar system may be transmitting radar signals at frequencies between 76 GHz and 81 GHz in the same general environment, interference can occur between radar signals from different radar systems. Interference occurs when two (or more) radars in relatively close proximity are operating on the same frequency or frequencies and can negatively impact radar reflection processing for both radar systems. As such, interference can disrupt a vehicle radar system and decrease the system's ability to measure aspects of the surrounding environment.

With the number of vehicles that radar continuing to increase overall, vehicle radar systems are more likely to encounter interference during navigation within various environments, especially in cities and other areas with dense populations that typically have more vehicles navigating in multiple directions. Thus, there clearly exists a need to be able to avoid or at least decrease the potential negative impacts (e.g., interference) that can arise when multiple vehicle radar systems are operating in the same environment.

Radar systems use some technique to help reduce potential interference with other emitters, such as frequency division multiple access (FDMA), Time division multiple access (TDMA), and polarization adjustments. FDMA involves separating channels by frequency. For instance, vehicle radar systems may occupy and use different frequencies for signal transmission to reduce potential interference. Because vehicle radars often operate within the same automotive frequency band, FDMA can be limited in reducing interference when multiple radar systems are operating in the same general location. TDMA is a channel access method that enables different emitters to share the same frequency channel by dividing the channel into different time slots. Although TDMA can increase channels available for signal transmissions, some situations may arise where TDMA fails to avoid potential interference with other nearby radar systems. Similarly, adjusting polarization during signal transmission can offer limited advantages that may fail to overcome potential interference scenarios that vehicle radar systems may encounter during navigation.

Example embodiments presented herein involve methods and systems for using Doppler coding to increase signal transmission diversity and reduce potential interference with nearby emitters. Doppler coding offers a time-space code that can simultaneously provide an ambiguity function while also permitting code space multiple-input and multiple-output (MIMO) channel orthogonality. By implementing a Doppler code selection strategy in a multi-channel system format, a radar system can use the techniques described herein to accurately measure the surrounding environment with less interference. Particularly, the Doppler coding can increase and isolate the quantity of channels available for signal transmission, which enables further variation relative to the operations of other emitters within the same general location. As such, vehicle radar systems and other types of emitters may implement techniques described herein to increase transmission options that can increase performance in environments where numerous emitters (e.g., other vehicle radar systems) may occupy at any given time.

Doppler codes may involve pulse-timing phase techniques designed to minimize peak cross-correlation in the Doppler domain. In general, cross-correlation represents a measure of similarity between two series as a function of the displacement of one relative to the other (e.g., series of incoming radar reflections received by a radar system). Reducing cross-correlation between channels can enable further differentiation between radar signals transmitted by a vehicle radar system and the signals emitted by other emitters in the same location. As a result, Doppler coding may allow several signals to be sent/received simultaneously via phase shifting at the pulse rate, which can enable efficient operation within noisy environments.

As an alternative to TDMA, Doppler coding offers a time-space code that also provides a reasonable ambiguity function along with code space MIMO channel orthogonality. The ambiguity function may be a two-dimensional (2D) function of propagation delay and Doppler frequency and can represent the distortion of a returned pulse due to the receiver matched filter of the return from a moving target. In some instances, the ambiguity function provided when using Doppler coding can be defined by the properties of the pulse and of the filter.

Doppler codes may be implemented with phase modulation in the slow time domain and can minimize the peak cross-correlation in the Doppler domain during the transmission and reception of radar signals by a radar system. Radar processing can occur over consecutive pulses that lie within the coherent processing interval, considered "slow" time. For example, a radar system may be configured to use a Doppler code (or a variant of a Doppler code) to minimize peak cross-correlation along with the use of a mismatched Doppler filter, such as a windowing function for sidelobe suppression of radar signals. In particular, ringing artifacts can pose a problem with search, detection, and ambiguity resolution in radar reflections obtained via pulse transmissions. As such, the shape of the transmit pulse can be adjusted to smooth the leading edge and trailing edge so that RF power may be increased and decreased without an abrupt change. For instance, radar units may transmit signals as pulse-Doppler stretch Linear Frequency Modulated (LFM) waveforms. The shape of received pulses can be adjusted using a window function that can minimize ringing that occurs any time pulses are applied to a filter. In a digital system, the window function can adjust the phase and/or amplitude of each sample before the sample is applied to the fast Fourier transform (FFT). A filter (e.g., a Doppler Matched filter) can help increase the main lobe of transmission and minimize undesired sidelobes that can negatively impact efficiency and accuracy of radar operations.

In addition, the radar system may use filter weights configured to combine channel decoding and Doppler estimation to isolate the coded channels within received radar signals to further enhance processing of received radar signals. The filter weights can be modified by the radar system based on desired output when applying the filter (e.g., the Doppler filter). The filter weights can be refined over time to increase clarity within radar measurements captured by the system.

To further illustrate, an example embodiment may involve a radar system that includes one or more radar units having antenna arrays. For instance, a radar unit may include a 2D transmission antenna array having multiple rows of transmission antennas. A computing system may cause the radar unit to transmit signals into the environment using Doppler coding. The Doppler coding may isolate transmit channels along a vertical direction of the 2D transmission antenna array. For example, the radar unit may transmit signals having pulse-Doppler stretch linear frequency modulated (LFM) waveforms. In some examples, the computing device may also cause the radar unit to use TDMA to isolate transmit channels along a horizontal direction of the 2D transmission antenna array. As such, the radar unit (or another radar unit) may receive radar reflections and enable the processing system to determine information representative of the environment. For instance, the computing system may process the reflections to determine a 2D image depicting the environment where pixels in the 2D image include azimuthal information based on the transmit channels isolated via TDMA and elevation information based on the transmit channels isolated via Doppler coding.

In some embodiments, a vehicle radar system may use different Doppler codes for radar units to differentiate between transmissions from these radar units. For instance, a front left radar unit may use a Doppler code during signal transmission while a front right radar unit may use a different Doppler code for signal transmission. Other techniques may be used by the vehicle radar system to further differentiate signal transmissions from different radar units.

In some examples, a fleet of autonomous vehicle may leverage techniques described herein to reduce interference during operations. Particularly, each vehicle may use a combination of Doppler coding and other interference mitigation techniques to reduce interference during navigation. In some instances, the vehicles may communicate with each other to coordinate efforts to reduce interference.

The following detailed description may be used with an apparatus (e.g., radar unit) having one or multiple antenna arrays. The one or multiple antenna arrays may take the form of a MIMO radar antenna architecture. One or more antenna arrays can include uniform linear array (ULA) arrangements and/or staggered arrangements. In a staggered arrangement, one or more radiating elements (antennas) can be offset relative to the alignment of other radiating elements in the array.

In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm, 4 mm). A radar system may use one or more antennas that can focus radiated energy into tight beams to measure an environment with high accuracy. Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

Some example radar architecture may include multiple metal layers (e.g., aluminum plates) machined with computer numerical control (CNC), aligned and joined together. For example, a metal layer may include a first half of an input waveguide channel, where the first half of the first waveguide channel includes an input port that may be configured to receive electromagnetic waves (e.g., W-band waves) into the first waveguide channel. The metal layer may also include a first half of a plurality of wave-dividing channels. The plurality of wave-dividing channels may comprise a network of channels that branch out from the input waveguide channel and that may be configured to receive electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. The waveguide antenna elements and/or the waveguide output ports may be rectangular in shape, in some embodiments. In alternative embodiments, the waveguide antenna elements and/or the waveguide output ports may be circular in shape. Other shapes are also possible.

Based on the shape and the materials of the waveguides, the distribution of propagating energy can vary at different locations within a radar unit, for example. The shape and the materials of the waveguides can define the boundary conditions for the electromagnetic energy. Boundary conditions are known conditions for the electromagnetic energy at the edges of the waveguides. For example, in a metallic waveguide, assuming the waveguide walls are nearly perfectly conducting (i.e., the waveguide walls can be approximated as perfect electric conductors—PECs), the boundary conditions specify that there is no tangentially (i.e., in the plane of the waveguide wall) directed electric field at any of the wall sides. Once the boundary conditions are known, Maxwell's Equations can be used to determine how electromagnetic energy propagates through the waveguides.

Maxwell's Equations may define several modes of operation for any given waveguide. Each mode has one specific way in which electromagnetic energy can propagate through the waveguide. In addition, each mode has an associated cutoff frequency. A mode is not supported in a waveguide if the electromagnetic energy has a frequency that is below the cutoff frequency. By properly selecting both (i) dimensions and (ii) frequency of operation, electromagnetic energy may propagate through the waveguides in specific modes. The waveguides can be designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the waveguide (e.g., assuming a rectangular waveguide). However, a suffix number of zero indicates that there is no variation of the field with respect to that direction. For example, a $TE_{10}$ mode indicates the waveguide is half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is one wavelength in width (i.e., two half wavelengths) and one half wavelength in height.

When operating a waveguide in a TE mode, the suffix numbers also indicate the number of field-maximums along the respective direction of the waveguide. For example, a $TE_{10}$ mode indicates that the waveguide has one electric field maximum in the width direction and zero maxima in the height direction. In another example, a $TE_{21}$ mode indicates that the waveguide has two electric field maxima in the width direction and one maximum in the height direction.

Additionally or alternatively, different radar units using different polarizations may prevent interference during operation of the radar system. For example, the radar system may be configured to interrogate (i.e., transmit and/or receive radar signals) in a direction normal to the direction of travel of an autonomous vehicle via SAR functionality. Thus, the radar system may be able to determine information about roadside objects that the vehicle passes. In some examples, this information may be two dimensional (e.g., distances various objects are from the roadside). In other examples, this information may be three dimensional (e.g., a point cloud of various portions of detected objects). Thus, the vehicle may be able to "map" the side of the road as it drives along, for example.

Some examples may involve using radar units having antenna arrays arranged in MIMO architecture. Radar signals emitted by the transmission antennas are orthogonal to each other and can be received by one or multiple corresponding reception antennas. As such, the radar system or associated signal processor can perform 2D SAR image formation along with a 3D matched filter to estimate heights for pixels in a 2D SAR map formed based on the processed radar signals.

If two autonomous vehicles are using analogous radar systems to interrogate the environment (e.g., using the SAR technique described above), it could also be useful for those autonomous vehicles to use different polarizations (e.g., orthogonal polarizations) to do the interrogation, thereby preventing interference. Additionally, a single vehicle may operate two radar units having orthogonal polarizations so that each radar unit does not interfere with the other radar unit.

Further, the configuration of a radar system can differ within examples. For instance, some radar systems may consist of radar units that are each configured with one or more antennas arrays. An antenna array may involve a set of multiple connected antennas that can work together as a single antenna to transmit or receive signals. By combining multiple radiating elements (i.e., antennas), an antenna array may enhance the performance of the radar unit when compared to radar units that use non-array antennas. In particular, a higher gain and narrower beam may be achieved when a radar unit is equipped with one or more antenna arrays. As a result, a radar unit may be designed with antenna arrays in a configuration that enables the radar unit to measure particular regions of the environment, such as targeted areas positioned at different ranges (distances) from the radar unit.

Radar units configured with antenna arrays can differ in overall configuration. For instance, the number of arrays, position of arrays, orientation of arrays, and size of antenna arrays on a radar unit can vary in examples. In addition, the quantity, position, alignment, and orientation of radiating elements (antennas) within an array of a radar unit can also vary. As a result, the configuration of a radar unit may often depend on the desired performance for the radar unit. For example, the configuration of a radar unit designed to measure distances far from the radar unit (e.g., a far range of the radar unit) may differ compared to the configuration of a radar unit used to measure an area nearby the radar unit (e.g., a near field of the radar unit).

To further illustrate, in some examples, a radar unit may include the same number of transmission antenna arrays and reception antenna arrays (e.g., four arrays of transmission antennas and four arrays of reception antennas). In other examples, a radar unit may include a number of transmission antenna arrays that differs from the number of reception antenna arrays (e.g., 6 transmission antenna arrays and 3 reception antenna arrays). In addition, some radar units may operate with parasitic arrays that can control radar transmissions. Other example radar units may include one or multiple driven arrays that have radiating elements connected to an energy source, which can have less overall energy loss when compared to parasitic arrays.

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array.

A radar unit may also include multiple types of arrays (e.g., a linear array on one portion and a planar array on another portion). As such, radar units configured with one or more antenna arrays can reduce the overall number of radar units a radar system may require to measure a surrounding environment. For example, a vehicle radar system may include radar units with antenna arrays that can be used to measure particular regions in an environment as desired while the vehicle navigates.

Some radar units may have different functionality and operational characteristics. For example, a radar unit may be configured for long-range operation and another radar unit may be configured for short-range operation. A radar system may use a combination of different radar units to measure different areas of the environment. Accordingly, it may be desirable for the signal processing of short-range radar units to be optimized for radar reflections in the near-field of the radar unit.

Referring now to the figures, FIG. 1 is a functional block diagram illustrating example vehicle 100. Vehicle 100 may represent a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted atop the roof of vehicle 100. Additionally, other mounting locations are possible within examples.

Figure 3A:
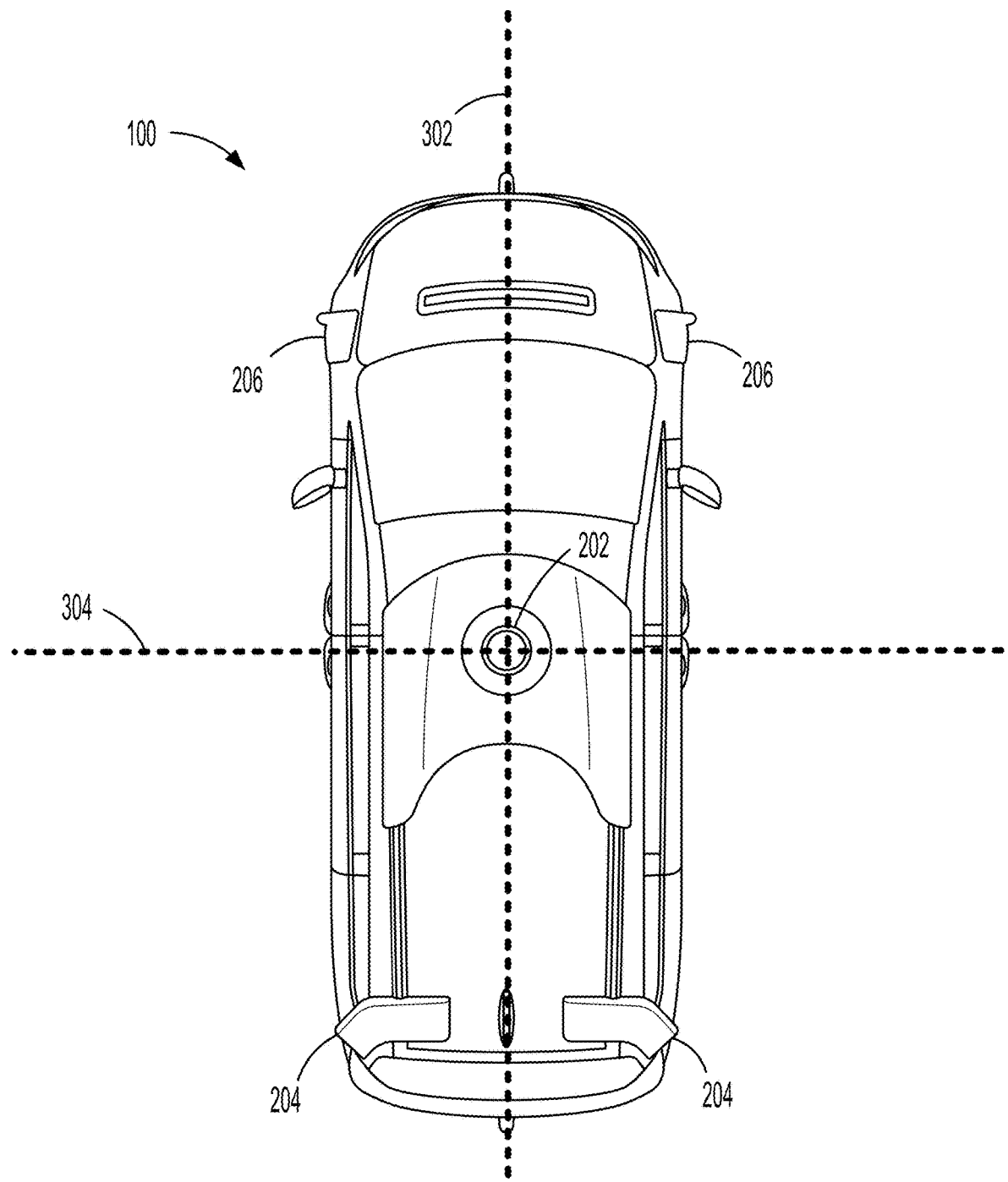
FIG. 3A illustrates a layout of radar sectors, according to one or more example embodiments.

FIG. 3A illustrates a layout of radar sectors, according to one or more embodiments. As shown, each radar sector may have an angular width approximately equal to the scanning range of the radar units. For example, the sectors may divide the azimuth plane around vehicle 100 into multiple sectors (e.g., 90 degree sectors, 120 degree sectors). In various different examples, scanning may be performed on the transmit side, the receive side, or both. For example, scanning on the transmit side may include iteratively transmitting a radar signal in predetermined directions and receiving radar signals across the full sector. In another example, scanning on the receive side may include transmitting a radar signal across the full sector and receiving radar signals across the full sector and performing digital beamforming on the received signals. In other examples, different forms of scanning may be used as well.

The example radar sectors may align with axes 302, 304 relative to vehicle 100. In some instances, each radar unit may be configured to scan across one sector. Further, because each example radar unit of FIG. 3A has a scanning angle of approximately 90 degrees, each radar unit scans a region that may not overlap with the scanning angle of other radar units. In other examples, the sectors may overlap.

In order to achieve radar sectors defined by the midpoints of vehicle 100, each radar unit may be mounted at a 45-degree angle with respect to the two axes of vehicle 100. By mounting each radar unit a 45 degree angle with respect to the two axes of vehicle 100, a 90 degree scan of the radar unit would scan from one vehicle axis to the other vehicle axis. For example, radar units mounted at a 45-degree angle to the axes at sensor positions 206 may be able to scan the front left and front right sectors (from vertical axis 302 through the front of vehicle 100 to horizontal axis 304 that runs through the sides of the vehicle, respectively). In order to scan the back right and back left sectors, radar units may be mounted at sensor positions 204. The radar unit placements shown in FIG. 3A are merely to illustrate one possible example.

In various other examples, radar units may be placed in other locations, such as on top or along (or within) other portions of the vehicle, and/or coupled to the underbody of vehicle 100. Further, the sectors may also be defined differently in other embodiments. For example, the sectors may be at a 45-degree angle with respect to the vehicle. In this example, one radar unit may face forward, another radar unit orientated backwards, and the other two to the sides of the vehicle.

In some examples, all the radar units of vehicle 100 may be configured with the same scanning angle. The azimuth plane around the vehicle is equal to If a full 360 degrees. Thus, if each radar unit is configured with the same scanning angle, then the scanning angle for the radar units would be equal to approximately 360 divided by the number of radar units on the vehicle. Thus, for full azimuth plane scanning, vehicle 100 with one radar unit would need that radar unit to be able to scan over the full 360 degrees.

If vehicle 100 had two radar units, each would scan approximately 180 degrees. For three radar units, each would be configured to scan 120 degrees. For four radar units, as shown in FIG. 3A, each may scan approximated 90 degrees. Five radar units may be configured on vehicle 100 and each may be able to scan 72 degrees. Further, six radar units may be configured on vehicle 100 and each may be able to scan approximately 60 degrees. Other examples are possible In further examples, the number of radar units may be chosen based on a number of criteria, such as ease of manufacture of the radar units, vehicle placement, or other criteria. For example, some radar units may be configured with a planar structure that is sufficiently small. The planar radar unit may be mountable at various positions on a vehicle. For example, a vehicle may have a dedicated radar housing mounted on the top of the vehicle. The radar housing may contain various radar units. In other embodiments, radar units may be placed within the vehicle structure.

In some embodiments, it may be desirable to place radar units in positions where the object covering the radar unit (i.e., radome) is at least partially transparent to radar. For example, various plastics, polymers, and other materials may form part of the vehicle structure and cover the radar units, while allowing the radar signal to pass through.

Additionally, in some embodiments, the radar units may be configured with different scanning ranges for different radar units. In some embodiments, a specific radar unit with a wide scanning angle may not be able to be placed on the vehicle in the proper location. Thus, a smaller radar unit, with a smaller scanning angle may be placed in that location. However, other radar units may be able to have larger scanning angles. Therefore, the total scanning angle of the radar units may add up to 360 degrees (or more) and provide full 360 degree azimuthal scanning. For example, a vehicle may have 3 radar units that each scan over 100 degrees and a fourth radar unit that scans over 60 degrees. Thus, the radar units may be able to scan the full azimuth plane, but the scanning sectors may not be equal in angular size.

Radar units can measure the nearby environment, which may involve transmitting radar signals via pulses. Particularly, pulse compression can involve the transmission of a long coded pulse and the processing of received echo (radar reflections) to obtain a relatively narrow pulse. Pulse-Doppler radar is based on the Doppler Effect, where movement in range produces frequency shift on the signal reflected from the target. As the reflector moves between each transmit pulse, the returned signal has a phase difference (phase shift) from pulse to pulse. A radar unit can leverage the Doppler Effect to separate the reflections from multiple objects in the same volume of space by separating the objects using a spread spectrum to segregate different signals.

Figure 3B:
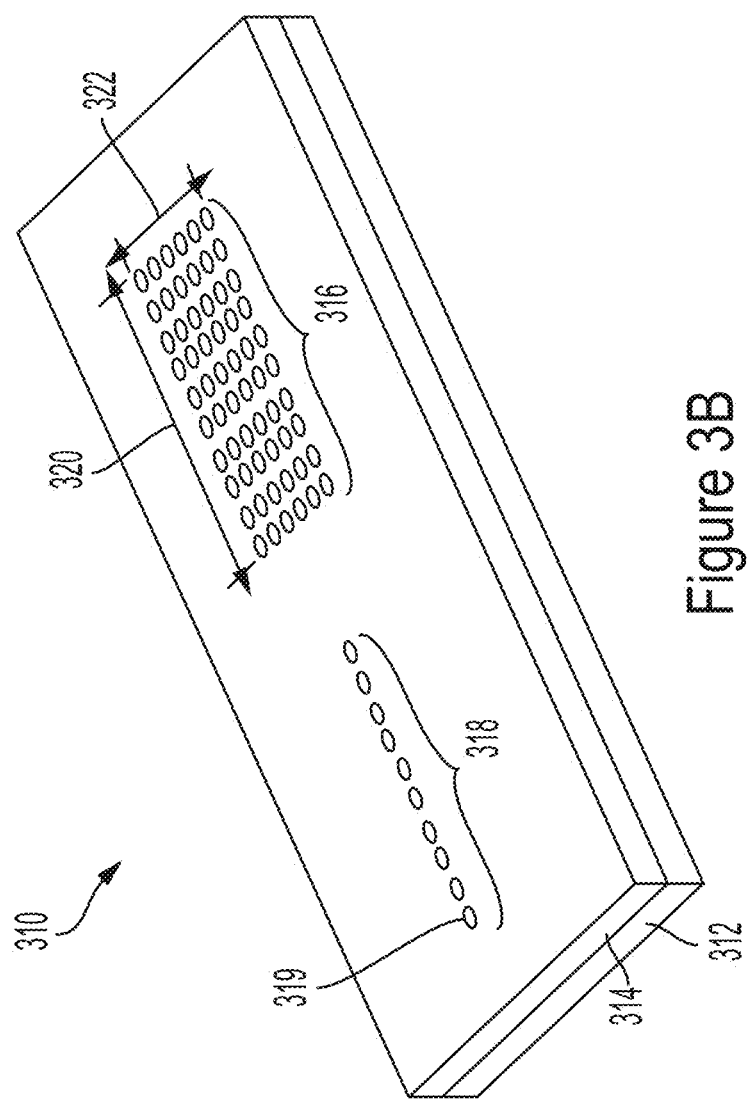
FIG. 3B illustrates a radar unit, according to one or more example embodiments.

FIG. 3B illustrates radar unit 310. Radar unit 310 represents a structural configuration for a radar unit that may perform operations herein. For example, a computing device may use radar unit 310 to transmit radar signals using Doppler coding.

In the embodiment, radar unit 310 includes bottom block 312 and top block 314, which may include portions of waveguides to enable the propagation of electromagnetic energy for signal transmission and reception. Top block 314 includes 2D transmission antenna array 316 and reception antenna array 318 with each array made up of antennas 319. The quantity and arrangement of antennas within arrays 316, 318 may differ in other examples. In addition, top block 314 may include additional arrays in other embodiments.

Transmission antenna array 316 includes 6 rows of antennas 319 that span across 10 columns. In other examples, transmission antenna array 316 may include more or less rows and/or more or less columns. During signal transmission, a computing device may cause radar unit 310 to transmit signals using Doppler coding to isolate transmit channels along a vertical direction 322 (i.e., across different rows). This can be done using different rows of antennas 319 and/or virtually using different antennas. Similarly, the computing device may cause radar unit 310 to transmit signals using TDMA to isolate channels across along a horizontal direction 320 of array 316 (i.e., across different columns).

Reception antenna array 318 is shown as a uniform linear array (ULA), but can have another configuration in other embodiments. For instance, radar unit 310 may include a 2D reception antenna array in another example.

To further illustrate operation and processing performed by a radar system, the model described herein uses $N_t$ to represent the number of transmit channels for a radar unit, $N_p$ to represent the number of pulses performed by the transmit antennas of the radar unit, and $N_k$ to represent the number of analog-to-digital conversion (ADC) samples per pulse performed during processing. In addition, k is used to represent the ADC sample indexing variable, n is used to represent the pulse indexing variable, and p is used to index the transmit channels in each transmit sub-array. As such, $c_{n,p}$ is used to represent the phase code, indexed by slow time, at the transmit port. By extension, $v_0$ represents the location of the receive channel in the antenna frame of the radar unit and $u_p$ represents the location of the p-th transmit channel of the transmit channel of the radar unit. In some embodiments, a pulse-Doppler stretch LFM system may be used for modeling. If potential noise, residual video phase, and reflection magnitude are ignored, the received signal phase history ($\rho_{k,n,p}$) can be represented as follows:

$$\rho_{k,n,p} = \frac{2\pi\gamma k r_{n,p}}{(cf_s)} + \frac{2\pi f r_{n,p}}{c} + c_{n,p} + \alpha_p \quad [1]$$

In equation [1] above, c may be used to represent the propagation speed, γ may be used to represent the LFM ramp rate, $f_s$ may be used to represent the ADC sampling frequency, f may be used to represent the RF carrier frequency, and k may be used to represent the ADC indexing variable. In addition, $c_{n,p}$ can represent the transmit phase code and a can represent uncontrolled channel phase offsets.

In some embodiments, the radar processing system (e.g., a computing device) may utilize waveform orthogonalization techniques to derive spatial diversity from a single received radar signal. For instance, the system may perform Doppler coding across two or more transmit channels (indexed by p). As such, the analytic received signal, which includes some amplitude A, can then be expressed as follows:

$$p_{k,n} = A\Sigma_p \exp(j\rho_{k,n,p}) \qquad [2]$$

As shown in equation [2] above, the transmission channel index (p) in the received signal may be unavailable since the index (p) is combined in free space. A radar code may be used by a processor, such as the following example base code $c_{n,p}$:

$$c_{n,0} = 0 \qquad [3]$$

$$c_{n,1} = \frac{\pi n^2}{N_p} \qquad [4]$$

In some embodiments, the radar code may be designed for cross-correlation performance. The Doppler domain cross-correlation of an opposing code can be evenly spread and the signal to peak cross-correlation sidelobe ratio can be represented as $N_p$ for all signals with normalized Doppler frequency as follows:

$$\left\{ \frac{i}{N_p} : 0 \leq i \leq N_p - 1 \right\} \qquad [5]$$

Figure 4:
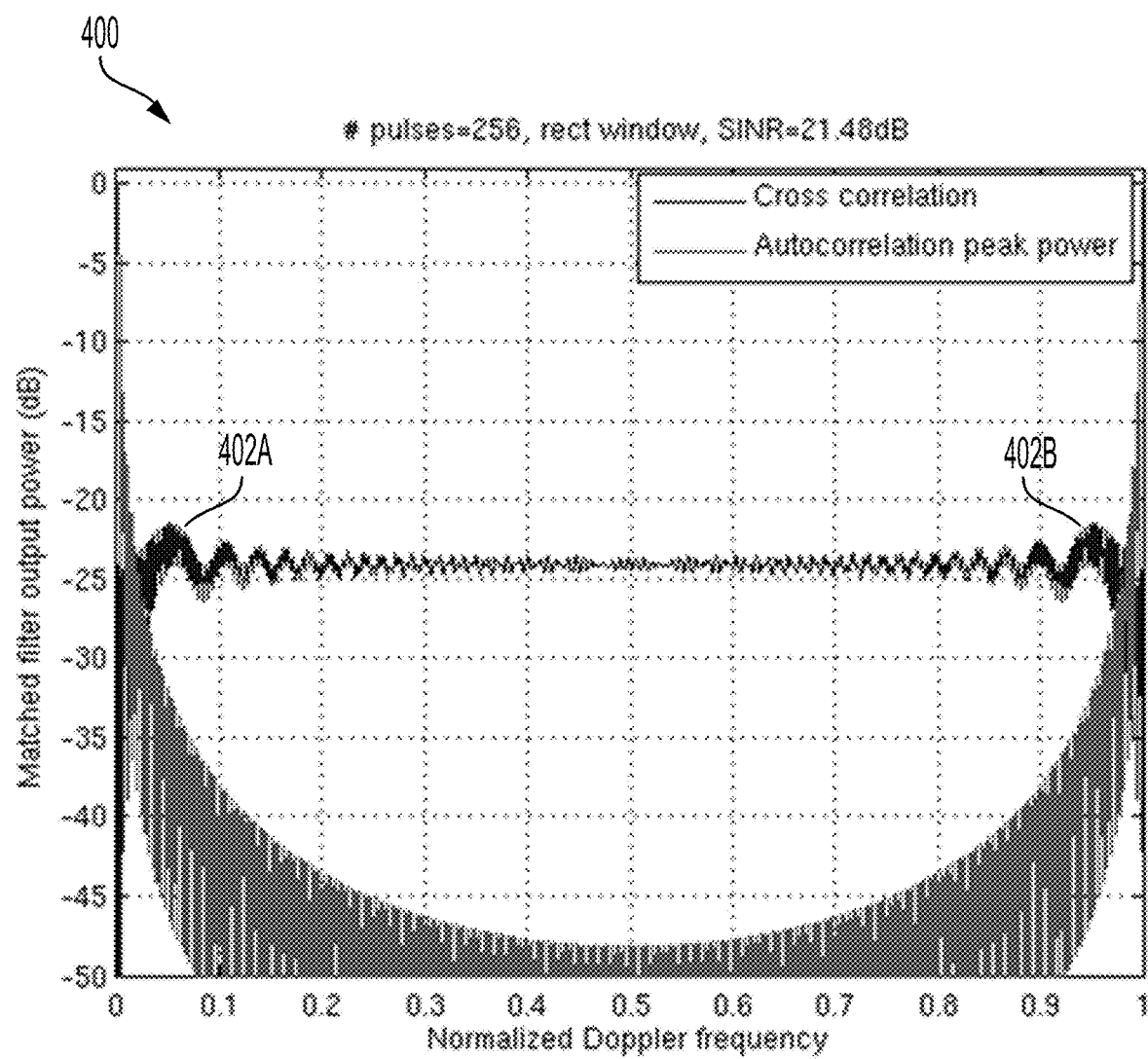
FIG. 4 illustrates a graph showing matched filter output power relative to normalized Doppler frequency, according to one or more example embodiments.

In practice, there may be some critical second order effects for the radar processing system to potentially factor when implementing the techniques presented above. Particularly, the second order effects may include straddled frequencies and windowing of slow time data. For straddled frequencies, the transmitted signal can be modulated by any normalized Doppler frequency in [0, 1). For instance, when the Doppler frequency falls between matched filter centers (i.e., straddles the filter centers), the output may include ripple in the code cross-correlation sidelobes. The ripple of the code cross-correlation sidelobes can be observed by over-resolving the matched filter as a proxy for applying arbitrary Doppler modulations as shown in FIG. 4. Particularly, the graph 400 represents the matched filter output power (dB) relative to the normalized Doppler frequency between zero and 1. As shown in the graph 400, the peak sidelobes 402A, 402B may be higher than $$\frac{1}{N_p} (\text{e.g., 2.6 dB higher}).$$

In addition, although the graph 400 represents an example implementation involving the radar unit transmitting a 256 pulse code and using a rectangle window, the pulse code and window function used can vary within examples.

Figure 5:
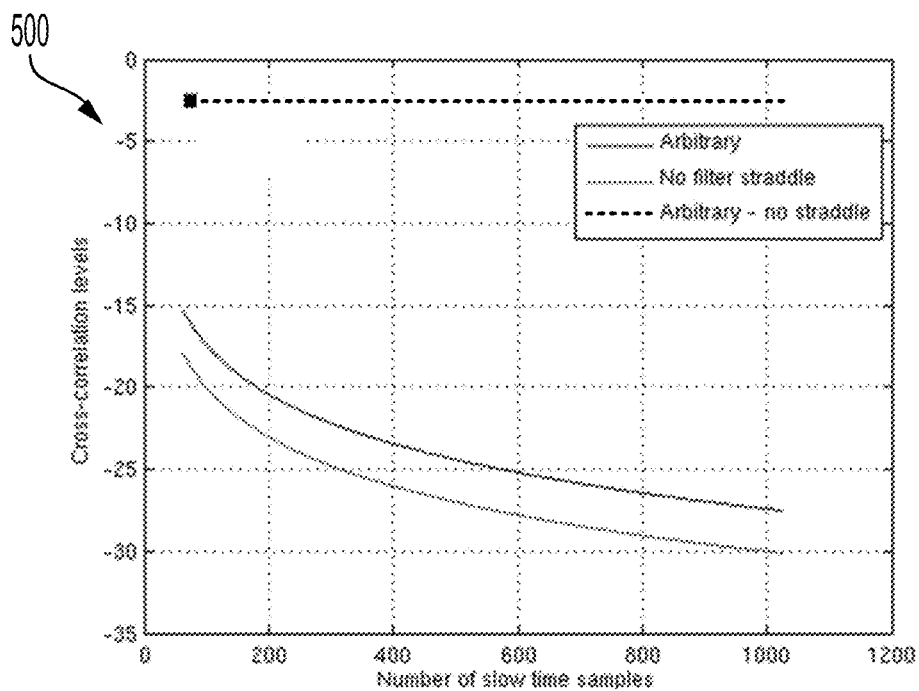
FIG. 5 illustrates a graph showing cross-correlation levels relative to slow time samples, according to one or more example embodiments.

As such, the effect may thus be independent of the code length, as shown in the graph 500 illustrated in FIG. 5. In particular, the graph 500 represents peak cross-correlation sidelobe level versus a number of pulses. The graph 500 shows the signal with and without target Doppler modulation matched filter straddle. As a result, the system may factor the effect when predicting peak sidelobe level.

With respect to slow time window, the processing system can apply a window function before an application of a Fourier transform (e.g., FFT) to reduce signal Doppler sidelobe levels. A window function may be used to taper the beginning and the end of the code relative to the middle of the code. Since the code may correspond to a chirp, the application of the window can change the envelope of the code's Doppler spectrum. For example, the computing device may use a rectangular window function to change the envelope.

Figure 6:
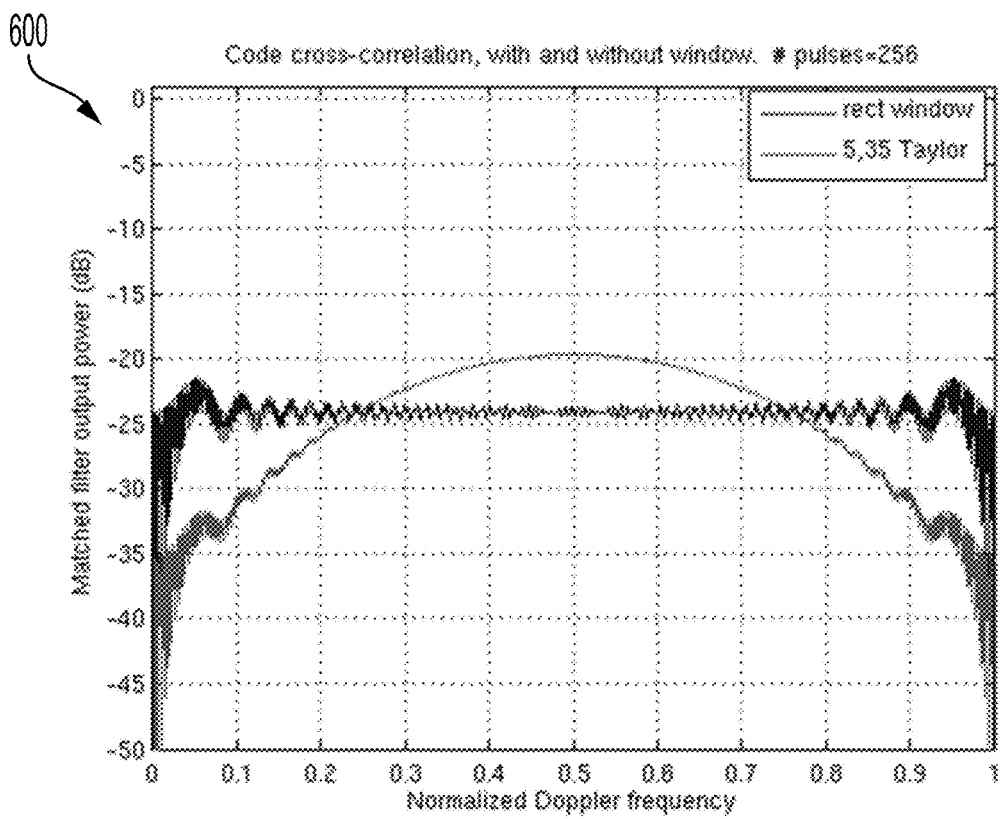
FIG. 6 illustrates a graph showing code cross-correlation with and without a window application, according to one or more example embodiments.

FIG. 6 illustrates a graph depicting code cross-correlation spectrum with and without the application of a window, according to one or more example embodiments. As shown in graph 600, the application of a window function can have an undesirable impact on peak cross-correlation level in some instances. As such, a radar processing system may alter the code to a degree to distribute spectral content more advantageously in the time domain. For example, the code can be parameterized with a ramp rate parameter γ as follows:

$$c_{n,0} = 0 \qquad [6]$$

$$c_{n,1} = \frac{\pi \gamma n^2}{N_p} \qquad [7]$$

Figure 7:
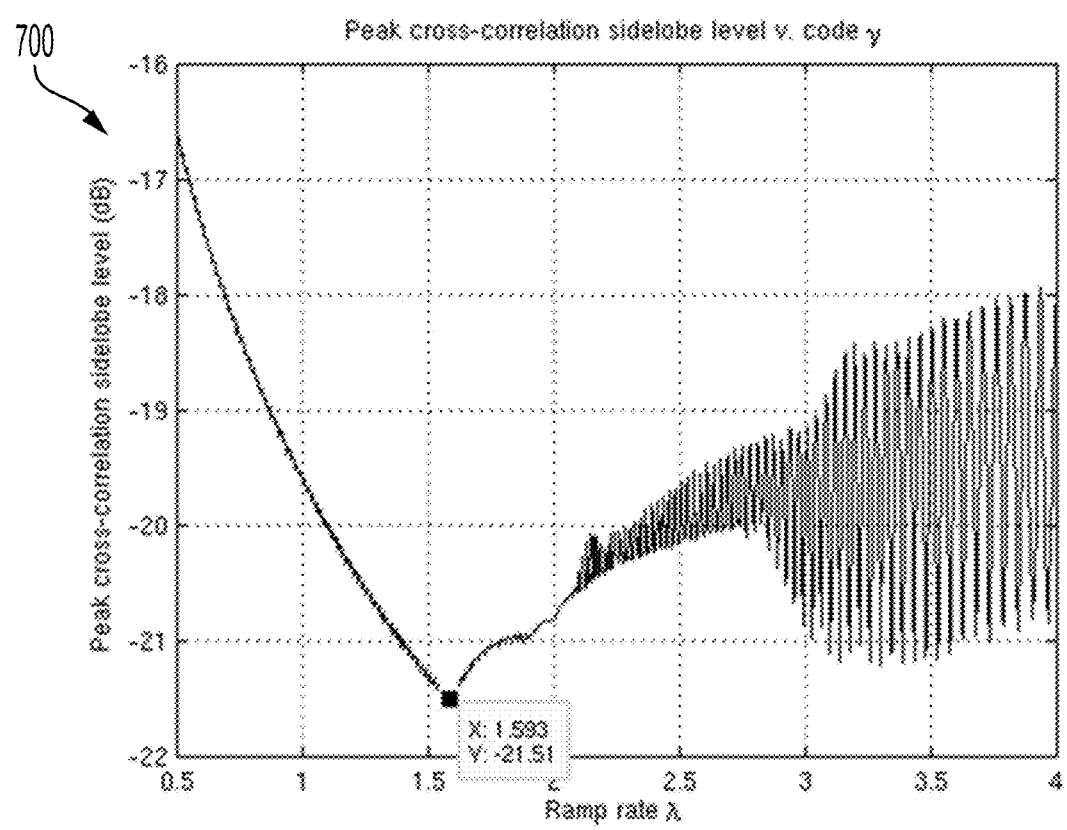
FIG. 7 illustrates a graph showing a peak cross-correlation sidelobe level relative to code ramp rate, according to one or more example embodiments.
Figure 8:
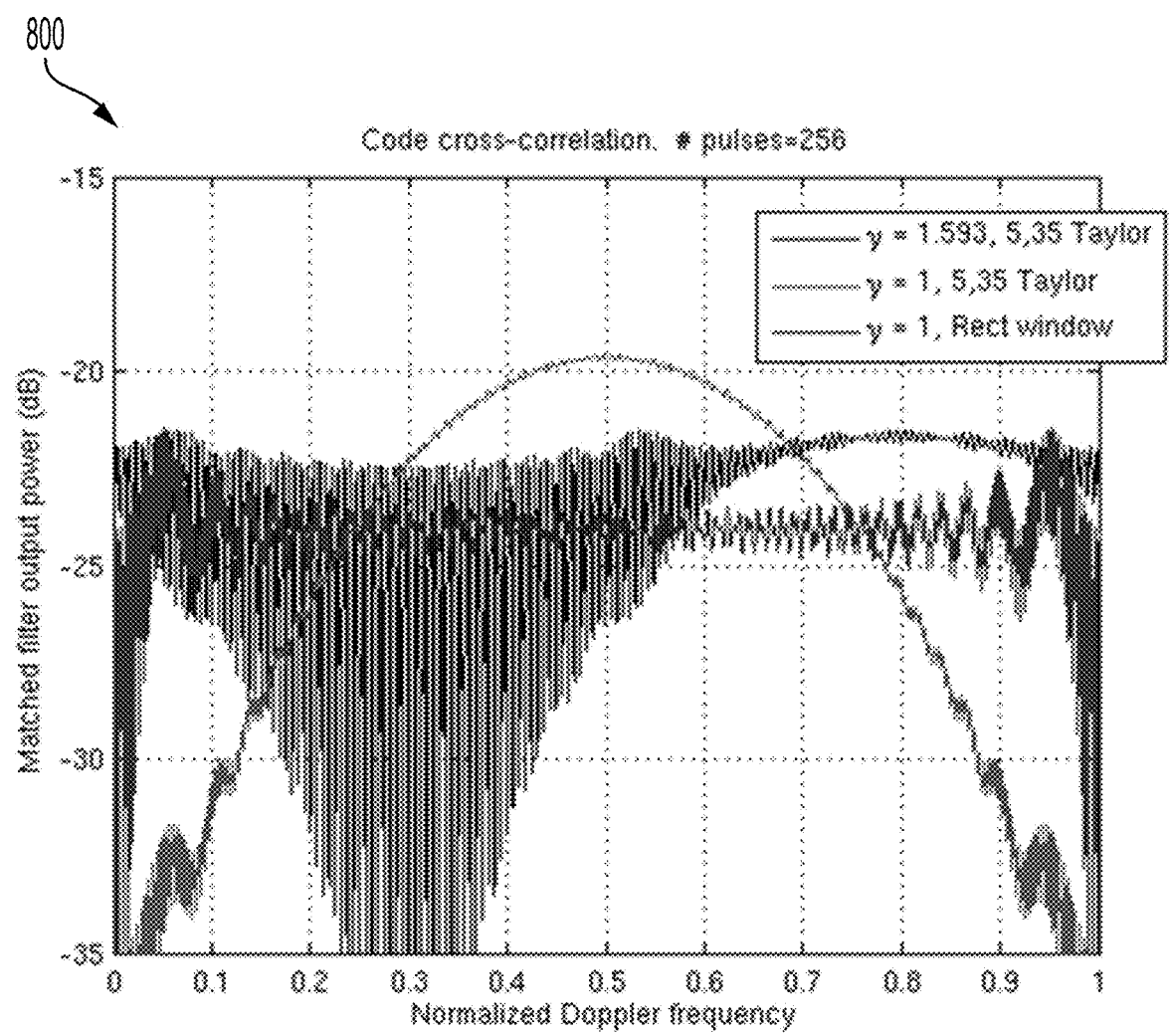
FIG. 8 illustrates a graph showing code cross-correlation, according to one or more example embodiments.

FIG. 7 illustrates a graph depicting peak cross-correlation sidelobe levels relative to ramp rate, according to one or more example embodiments. As shown in graph 700, the peak cross-correlation sidelobe level with a window can be calculated as a function of ramp rate (γ). In the example represented by the graph 700, an optimum code may be achieved at a particular ramp rate (e.g., ramp rate at γ≈1.6). The design, as shown, may have the same peak sidelobe level as the original code with a rectangular window as shown in the graph 800 illustrated in FIG. 8. The Doppler modulation of the transmitted signal by a target may have the effect of translating the cross-correlation spectrum, but may not otherwise change its character.

Figure 9:
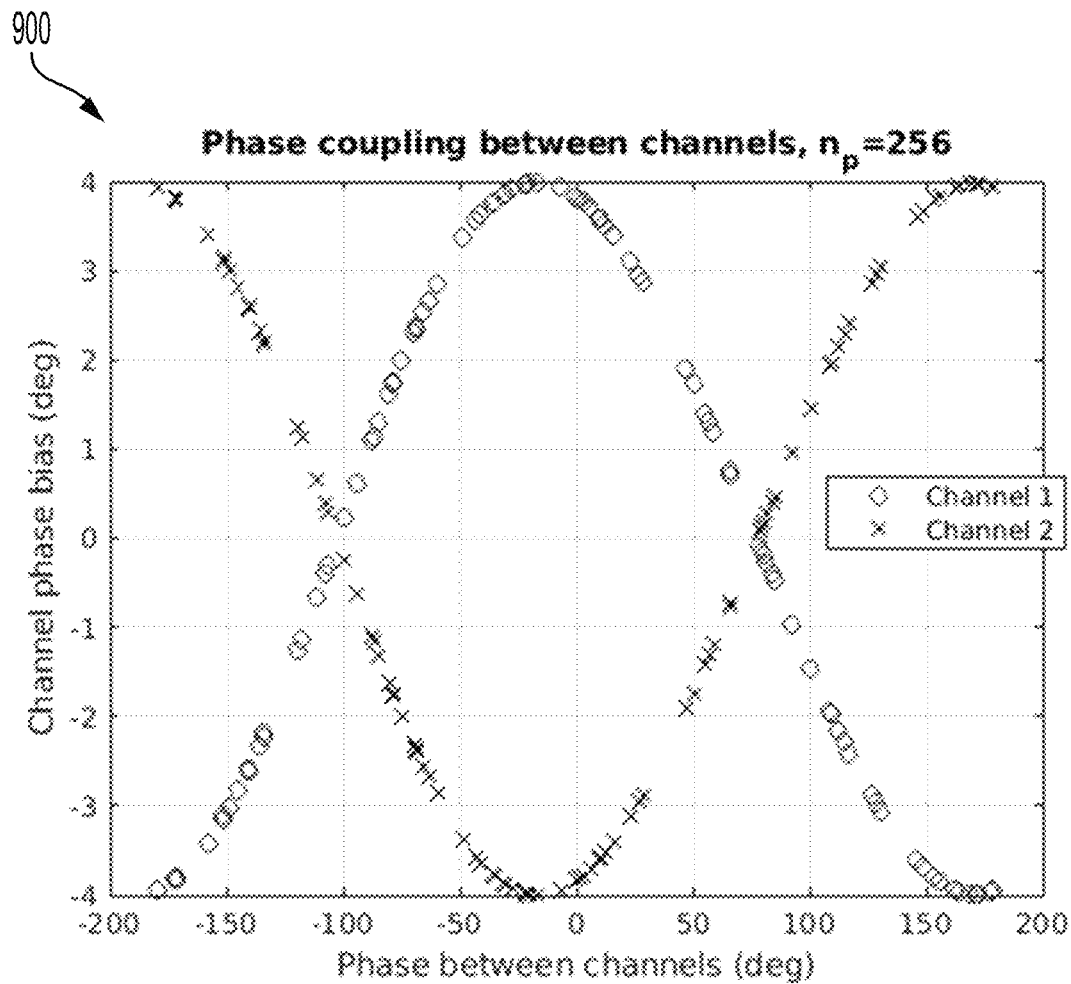
FIG. 9 illustrates a graph showing phase coupling between channels, according to one or more example embodiments.

The coding technique described above can result in some angle of arrival-dependent correlation between channels. In particular, the phase between transmit channels may create some uncompensated correlation of the coded MIMO signals that generates a deterministic bias in the phase of the decoded channels. For example, the magnitude of this variation can be determined in simulation to be about 4 degrees for a 256 pulse code as shown in the graph 900 illustrated in FIG. 9. In some instances, a longer code may yield a better isolation.

Figure 10:
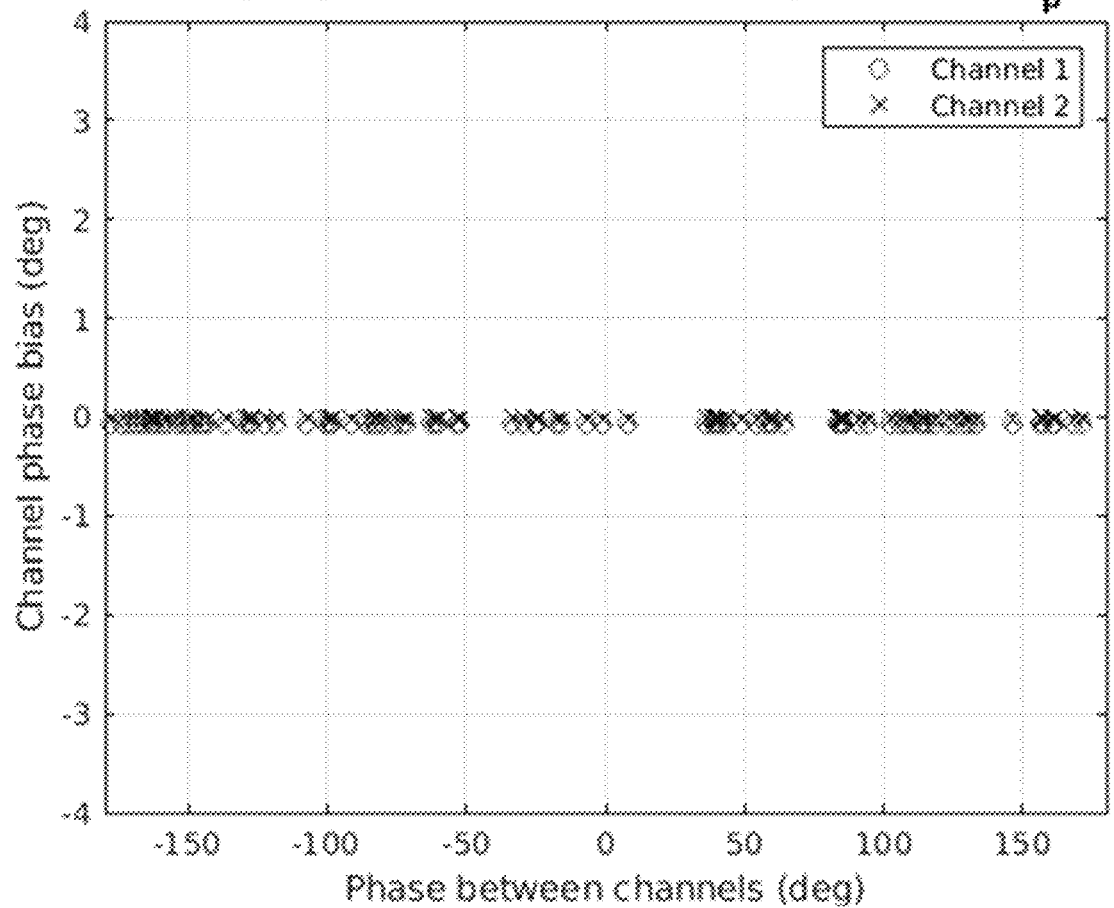
FIG. 10 illustrates a graph showing phase coupling between channels with an adaptive filter, according to one or more example embodiments.

A combined channel decoding and Doppler filter may be used by the system to increase isolation. For instance, a Doppler filter designed to maximize signal to noise plus code interface may be used. Such a filter can offer higher isolation between channels, which can be used for follow-on spatial beamformers as shown in the graph 1000 illustrated in FIG. 10. The graph 1000 shows a phase coupling between channels with an adaptive filter. In the example shown in FIG. 10, the graph 1000 is based on the radar system transmitting 256 pulse code, but other quantities of pulses may be used.

Figure 11:
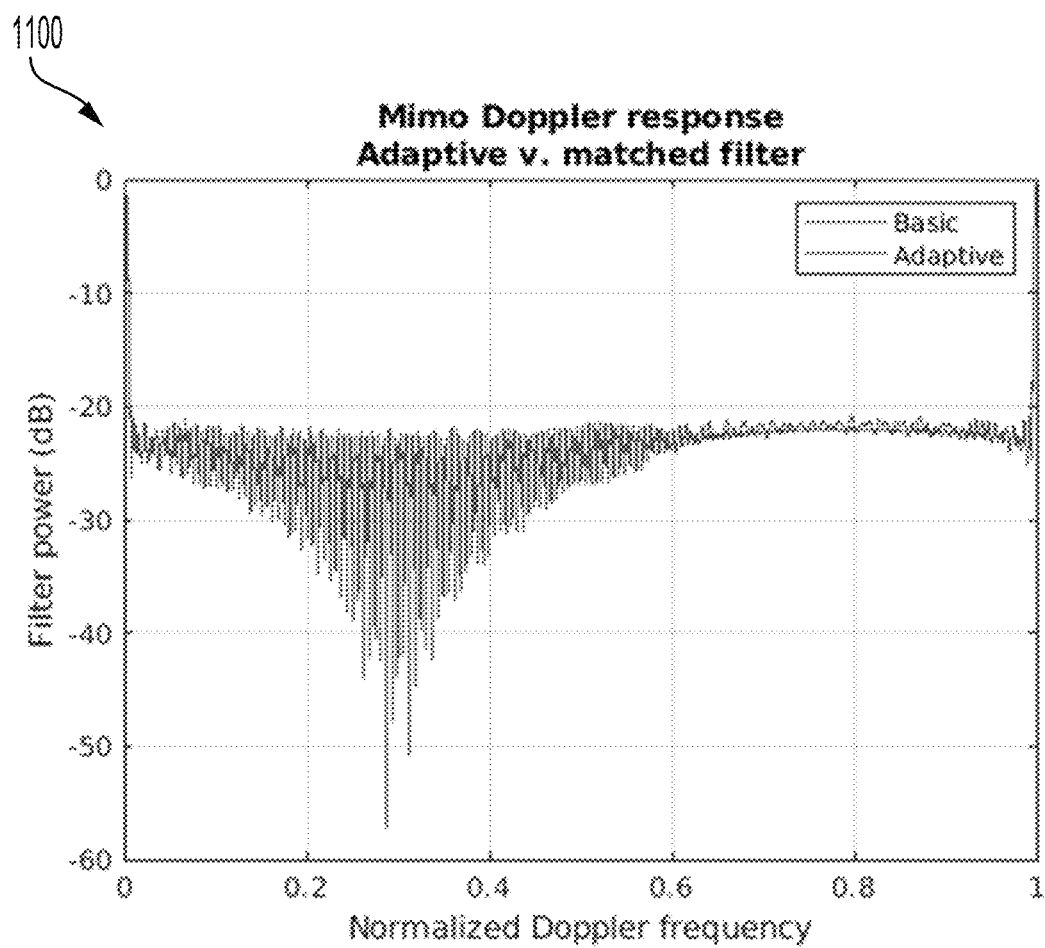
FIG. 11 illustrates a MIMO Doppler response graph, according to one or more example embodiments.

Cross-correlation sidelobes levels may be marginally worse than the matched filter, which can increase about 1 dB. In particular, this effect can be seen in the Doppler response of a single MIMO channel shown in the graph 1100 illustrated in FIG. 11. The graph 1100 shows MIMO Doppler response for adaptive versus matched filter with the filter power shown relative to the normalized Doppler frequency between zero to 1.

The system may perform processing starting with the output of range compression. Next, for a range rate filter centered at $\hat{h}$, a signal covariance matrix, one for each code $p \in \{0,1\}$, may be used as follows:

$$R_{n_1,n_2,p} = \exp\left(j\left[c_{n_1,p} + \frac{4\pi f n_1 \hat{h}}{cf_p}\right]\right)\exp\left(-j\left[c_{n_2,p} + \frac{4\pi f n_2 \hat{h}}{cf_p}\right]\right) + \sigma\delta(n_1 - n_2) \quad [8]$$

In equation [8], the matrix is diagonally loaded by a small term $\sigma$. A set of $N_p$ weights can be tailored to the two channels and to the range rate filter hypothesis $\hat{h}$ as follows:

$$w_{p=0,n} = \sum_{x \in \{0,1,\ldots N_p\}}\left[\{R^{-1}\}_{n,x,p}\exp\left(j\frac{4\pi f x \hat{h}}{cf_p}\right)\right] \quad [9]$$

$$w_{p=1,n} = \exp(jc_{n,1})\sum_{x \in \{0,1,\ldots N_p\}}\left[\{(R^*)^{-1}\}_{n,x,p}\exp\left(j\frac{4\pi f x \hat{h}}{cf_p}\right)\right] \quad [10]$$

Figure 12:
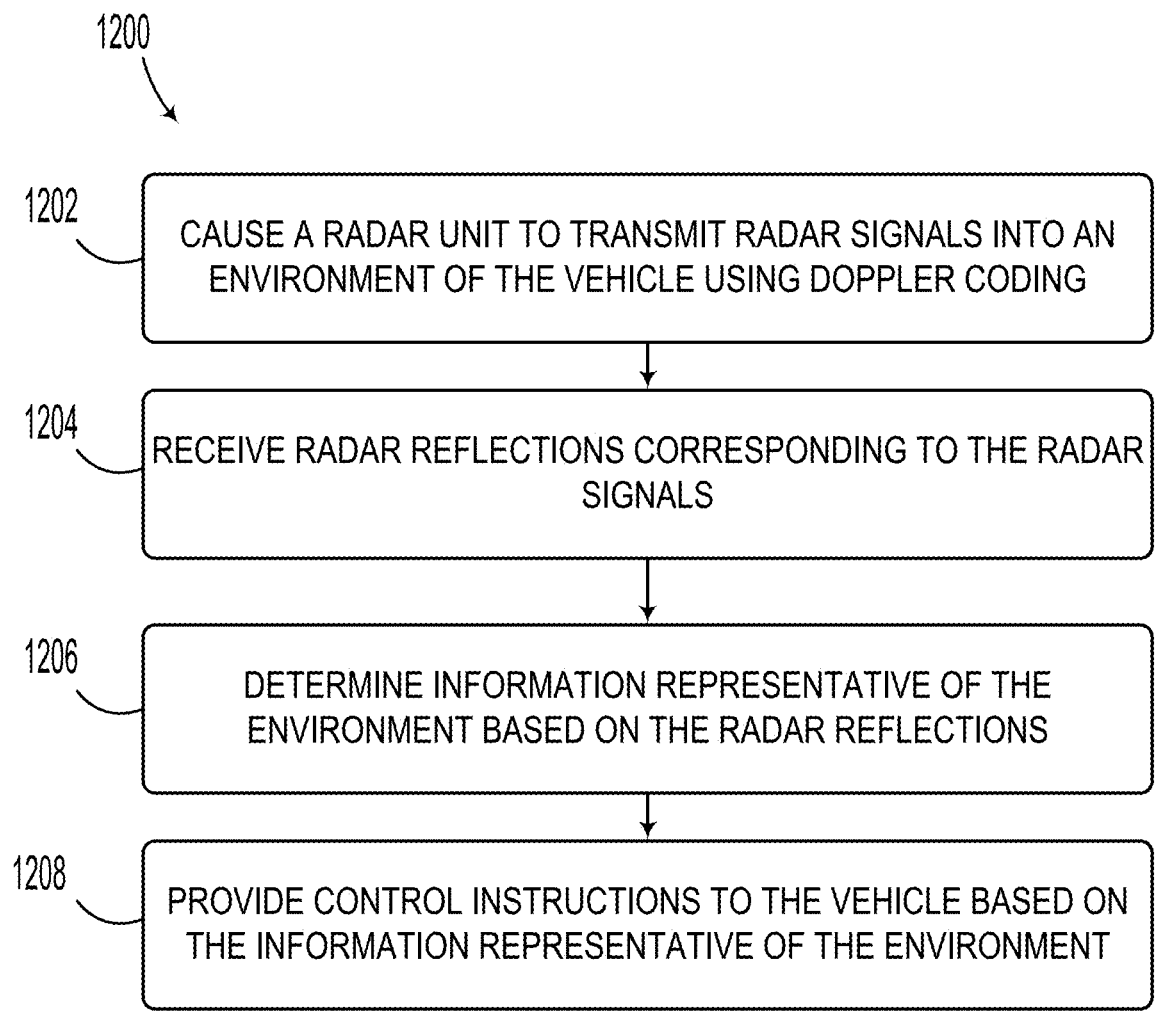
FIG. 12 is a flow chart of a method for signal transmission using Doppler coding, according to example embodiments.

FIG. 12 is a flowchart of a method for signal transmission using Doppler coding. Method 1200 represents an example method that may include one or more operations, functions, or actions, as depicted by one or more of blocks 1202, 1204, 1206, and 1208, each of which may be carried out by any of the systems shown in FIGS. 1-4, among other possible systems.

Those skilled in the art will understand that the flowchart described herein illustrate functionality and operation of certain implementations of the present disclosure. In this regard, each block of the flowchart may represent a module, segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrently or in reverse order, depending on the functionality involved, as would be understood by those reasonably skilled in the art. In examples, a computing system may cause a radar system to perform one or more blocks of method 1200.

At block 1202, method 1200 may involve causing a radar unit to transmit radar signals into an environment of a vehicle using Doppler coding. The transmission of the plurality of radar signals may involve using a set of orthogonal Doppler coding across transmit apertures of the radar unit. For example, the radar unit may transmit radar signals having pulse-Doppler stretch linear frequency modulated (LFM) waveforms.

A radar system may use one or more transmit apertures (antennas) to transmit radar signals into an environment. For instance, a radar unit of the radar system may use one or more linear arrays of transmit antennas to transmit radar signals. When selecting coding to use when transmitting radar pulses, the radar system may utilize one or more Doppler coding options (e.g., a set of orthogonal Doppler codes). In some instances, the Doppler coding may not be orthogonal. In some examples, the transmission of the radar signals may involve using Time-division multiple access (TDMA) across the transmit channels in azimuth.

In some examples, the radar unit may include 2D transmission antenna array. As such, the radar unit may transmit radar signals into the environment of the vehicle using Doppler coding such that Doppler coding isolates transmit channels. For instance, the radar unit may be configured to use Doppler coding to isolate transmit channels along a vertical direction of the 2D transmission antenna array. In addition, in some cases, the radar unit may also use TDMA during signal transmission such that the TDMA isolates transmit channels along a horizontal direction of the 2D transmission array.

At block 1204, method 1200 may involve receiving, from the radar unit, radar reflections corresponding to the radar signals. The received reflections may be indicative of multiple channels (e.g., two or more channels). These channels may depend on the Doppler coding selected during transmission of the radar signals. In some embodiments, the radar reflections may be received using antennas arranged in a uniform linear array (ULA). For instance, a radar unit may include one or more arrays.

At block 1206, method 1200 may involve determining information representative of the environment based on the radar reflections. Processing may involve identifying range values of the received signal using a transform function and applying a set of filter weights to isolate and decode the plurality of channels of the received signal. In addition, the processing may further involve performing matched filtering and object detection on the isolated and decoded plurality of channels to determine target information. The target information may depend on the identified range values.

In some examples, the selection of Doppler coding can increase spatial spread of the received radar signals. For instance, Doppler coding may enable the radar unit to operate as a communications terminal sending and receiving short messages as well as enabling a reduction of radio frequency interference (RFI) between adjacent radars. In some implementations, a Doppler code may divide a radar pulse into different time segments, referred to as chips, and apply a different phase to each. As such, the use of orthogonal Doppler codes may enable the radar processor to obtain radar measurements with reduced interference.

In some examples, the computing device may determine a 2D image representative of the environment where pixels in the 2D image include azimuthal information based on the transmit channels isolated via TDMA and elevation information based on the transmit channels isolated via Doppler coding.

At block 1208, method 1200 may involve providing control instructions to the vehicle based on the information representative of the environment. For instance, the computing system may provide instructions, which the vehicle may execute. The control instructions can depend on the position, motion, and orientation of one or more objects in the environment. The strategy may include obstacle avoidance and operating based on measurements of objects in the environment.

In some embodiments, method 1200 may further involve responsive to receiving the radar reflections corresponding to the plurality of radar signals, applying a window function to reduce signal Doppler sidelobe levels of the radar reflections. As such, the computing device may determine information representative of the environment after applying the window function to reduce signal Doppler sidelobe levels of the radar reflections. In some examples, the computing device may apply a rectangular window function to reduce the signal Doppler sidelobe levels. In addition, method 1200 may also involve processing, using a filter, the radar reflections to isolate and decode a plurality of channels and determining information representative of the environment based on the plurality of channels. The filter may be based on the Doppler coding.

Method 1200 may also involve determining range information corresponding to one or more objects in the environment using a Fourier transform (e.g., FFT) and the radar reflections and decoding respective channels from the radar reflections to increase dimensionality of data corresponding to the radar reflections. The computing device may also perform, using a Fourier transform, Doppler compression on the radar reflections and azimuth matched filtering on the radar reflections responsive to performing Doppler compression. As such, the computing device may determine the information representative of the environment based on outputs from performing azimuth matched filtering on the radar reflections.

Figure 13:
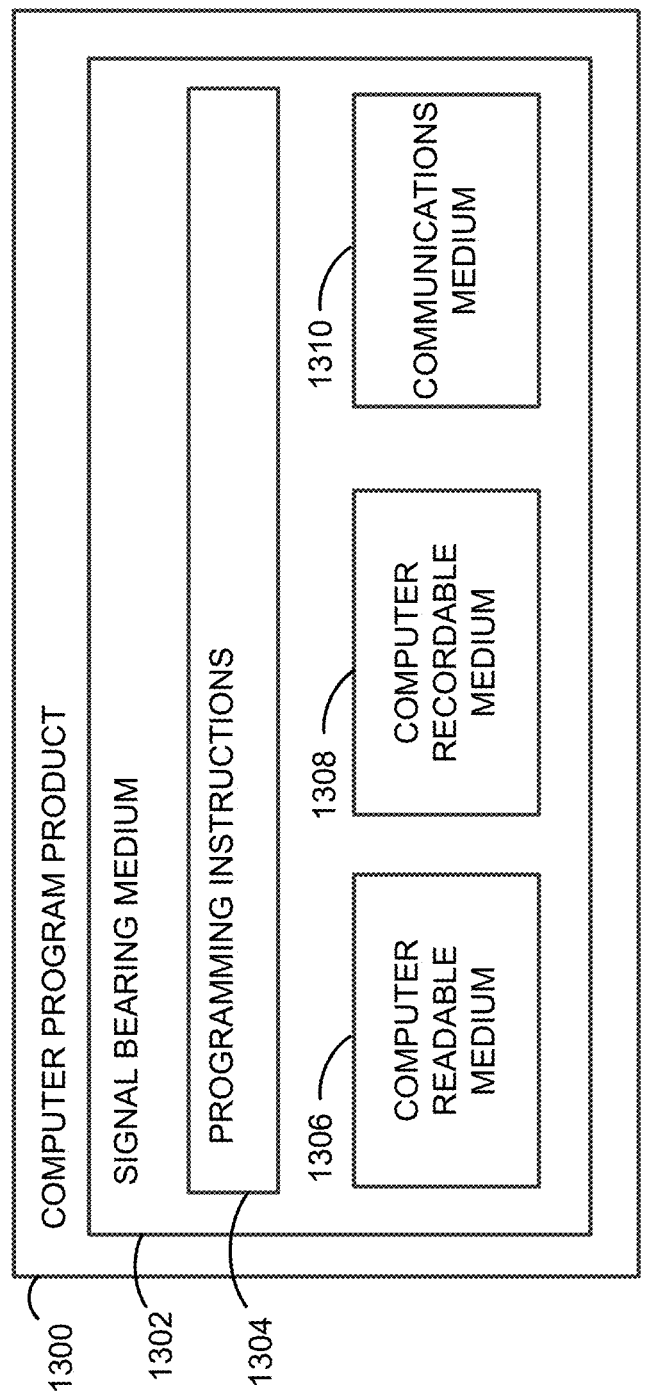
FIG. 13 illustrates a schematic diagram of a computer program, according to example embodiments.

FIG. 13 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 1300 is provided using signal bearing medium 1302, which may include one or more programming instructions 1304 that, when executed by one or more processors may provide functionality or portions of the functionality described above with respect to FIGS. 1-12. In some examples, the signal bearing medium 1302 may encompass a non-transitory computer-readable medium 1606, such as, but not limited to, a hard disk drive, a Compact Disc (CD), a Digital Video Disk (DVD), a digital tape, memory, etc. In some implementations, the signal bearing medium 1302 may encompass a computer recordable medium 1308, such as, but not limited to, memory, read/write (R/W) CDs, R/W DVDs, etc. In some implementations, the signal bearing medium 1302 may encompass a communications medium 1610, such as, but not limited to, a digital and/or an analog communication medium (e.g., a fiber optic cable, a waveguide, a wired communications link, a wireless communication link, etc.). Thus, for example, the signal bearing medium 1302 may be conveyed by a wireless form of the communications medium 1310.

The one or more programming instructions 1304 may be, for example, computer executable and/or logic implemented instructions. In some examples, a computing device such as the computer system 112 of FIG. 1 may be configured to provide various operations, functions, or actions in response to the programming instructions 1304 conveyed to the computer system 112 by one or more of the computer readable medium 1306, the computer recordable medium 1308, and/or the communications medium 1310.

The non-transitory computer readable medium could also be distributed among multiple data storage elements, which could be remotely located from each other. The computing device that executes some or all of the stored instructions could be a vehicle, such as vehicle 200 illustrated in FIGS. 2A-2D. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   causing, by a computing system coupled to a vehicle, a radar unit having a two-dimensional (2D) transmission array to transmit a plurality of radar signals into an environment of the vehicle using Doppler coding and time division multiple access (TDMA), wherein the Doppler coding isolates transmit channels along a first dimension of the 2D transmission antenna array and the TDMA isolates transmit channels along a second dimension of the 2D transmission antenna array, wherein the first dimension is orthogonal to the second dimension;
   receiving, by the computing system and from the radar unit, radar reflections corresponding to the plurality of radar signals;
   based on the radar reflections, determining information representative of the environment, wherein the information representative of the environment indicates a position and a motion of at least one object relative to the radar unit, and wherein the information representative of the environment includes elevation information based on the transmit channels isolated via the Doppler coding and azimuthal information based on the transmit channels isolated via the TDMA; and
   providing control instructions to the vehicle based on the position and the motion of the at least one object relative to the radar unit.

2. The method of claim 1, wherein causing the radar unit having the 2D transmission array to transmit the plurality of radar signals using Doppler coding comprises:
   causing the radar unit to transmit radar signals having pulse-Doppler stretch linear frequency modulated (LFM) waveforms.

3. The method of claim 1, wherein receiving radar reflections corresponding to the plurality of radar signals comprises:
   receiving the radar reflections using antennas arranged in a uniform linear array (ULA).

4. The method of claim 3, further comprising:
responsive to receiving the radar reflections corresponding to the plurality of radar signals, applying a window function to reduce signal Doppler sidelobe levels of the radar reflections; and
wherein determining information representative of the environment comprises:
determining the information representative of the environment after applying the window function to reduce signal Doppler sidelobe levels of the radar reflections.

5. The method of claim 4, wherein applying the window function to reduce signal Doppler sidelobe levels of the radar reflections comprises:
applying a rectangular window function to reduce the signal Doppler sidelobe levels of the radar reflections.

6. The method of claim 5, further comprising:
processing, using a filter, the radar reflections to isolate and decode a plurality of channels, wherein the filter is based on the Doppler coding; and
determining information representative of the environment based on the plurality of channels.

7. The method of claim 6, further comprising:
determining range information corresponding to one or more objects in the environment using a Fourier transform and the radar reflections; and
decoding respective channels from the radar reflections to increase dimensionality of data corresponding to the radar reflections.

8. The method of claim 7, further comprising:
performing, using a Fourier transform, Doppler compression on the radar reflections;
responsive to performing Doppler compression, performing azimuth matched filtering on the radar reflections; and
wherein determining information representative of the environment comprises:
determining the information representative of the environment based on outputs from performing azimuth matched filtering on the radar reflections.

9. The method of claim 1, wherein causing the radar unit having the 2D transmission array to transmit the plurality of radar signals into the environment of the vehicle using Doppler coding and TDMA comprises:
causing the radar unit to transmit radar signals based on pulses that differ in phase and timing across consecutive pulses.

10. The method of claim 1, wherein causing the radar unit having the 2D transmission array to transmit the plurality of radar signals into the environment of the vehicle using Doppler coding and TDMA comprises:
causing the radar unit to transmit radar signals such that the Doppler coding isolates transmit channels across rows of the 2D transmission array and the TDMA isolates channels across columns of the 2D transmission array.

11. The method of claim 1, wherein determining information representative of the environment comprises:
applying a filter to isolate coded channels within the radar reflections, wherein the filter includes weights configured to combine channel decoding and Doppler estimation.

12. A system comprising:
a radar unit having a two-dimensional (2D) transmission array; and
a computing device coupled to a vehicle, wherein the computing device is configured to:
cause the radar unit to transmit a plurality of radar signals into an environment of the vehicle using Doppler coding and time division multiple access (TDMA), wherein the Doppler coding isolates transmit channels along a first dimension of the 2D transmission antenna array and the TDMA isolates transmit channels along a second dimension of the 2D transmission antenna array, wherein the first dimension is orthogonal to the second dimension;
receive, from the radar unit, radar reflections corresponding to the plurality of radar signals;
based on the radar reflections, determine information representative of the environment, wherein the information representative of the environment indicates a position and a motion of at least one object relative to the radar unit, and wherein the information representative of the environment includes elevation information based on the transmit channels isolated via the Doppler coding and azimuthal information based on the transmit channels isolated via the TDMA; and
provide control instructions to the vehicle based on the position and the motion of the at least one object relative to the radar unit.

13. The system of claim 12, wherein 2D transmission antenna array includes a first row of transmission antennas and a second row of transmission antennas.

14. The system of claim 12, wherein the computing device is configured to cause the radar unit to transmit radar signals having pulse-Doppler stretch linear frequency modulated (LFM) waveforms.

15. The system of claim 14, wherein the computing device is configured to receive the radar reflections using antennas arranged in a uniform linear array (ULA) on the radar unit.

16. The system of claim 12, wherein the computing device is further configured to cause the radar unit to transmit radar signals based on pulses that differ in phase and timing across consecutive pulses.

17. The system of claim 12, wherein the Doppler coding is configured to isolate transmit channels across rows of the 2D transmission array and the TDMA is configured to isolate channels across columns of the 2D transmission array.

18. The system of claim 12, wherein the computing device is further configured to:
apply a filter to isolate coded channels within the radar reflections, wherein the filter includes weights configured to combine channel decoding and Doppler estimation.

19. A non-transitory computer-readable medium configured to store instructions, that when executed by a computing system comprising one or more processors, causes the computing system to perform operations comprising:
causing a radar unit having a two-dimensional (2D) transmission array to transmit a plurality of radar signals into an environment of a vehicle using Doppler coding and time division multiple access (TDMA), wherein the Doppler coding isolates transmit channels along a first dimension of the 2D transmission array and the TDMA isolates transmit channels along a second dimension of the 2D transmission antenna array, wherein the first dimension is orthogonal to the second dimension;
receiving, from the radar unit, radar reflections corresponding to the plurality of radar signals;
based on the radar reflections, determining information representative of the environment, wherein the information representative of the environment indicates a position and a motion of at least one object relative to the radar unit, and wherein the information representative of the environment includes elevation information based on the transmit channels isolated via the Doppler coding and azimuthal information based on the transmit channels isolated via the TDMA; and providing control instructions to the vehicle based on the position and the motion of the at least one object relative to the radar unit.

\* \* \* \* \*